April 20, 1937.  L. ZAIGER  2,077,818
SPLASH FLAP FOR AUTOMOBILES
Filed Oct. 23, 1935  2 Sheets-Sheet 1
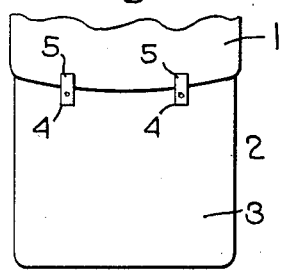
Fig.1.
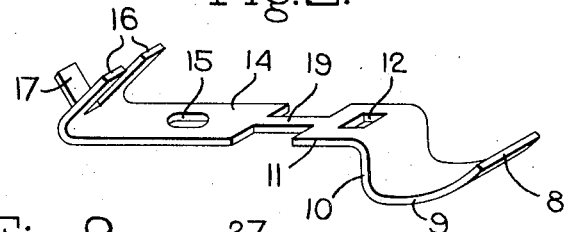
Fig.2.
Fig.8. 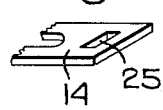  Fig.9. 
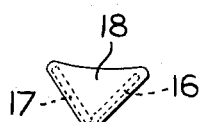
Fig.3.
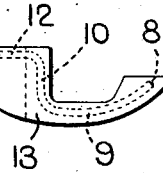
Fig.4.
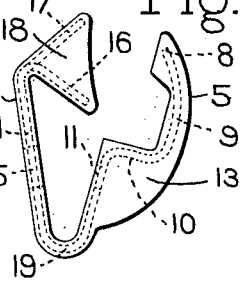
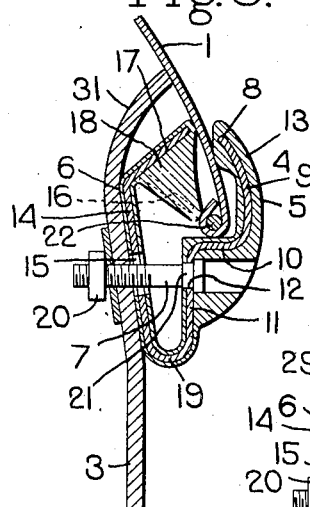
Fig.5.
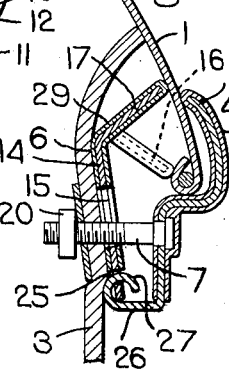
Fig.6. Fig.7.
Inventor.
Louis Zaiger
by Heard Smith & Tennant.
Attys.

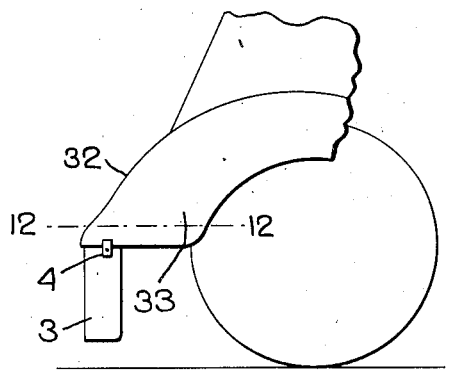
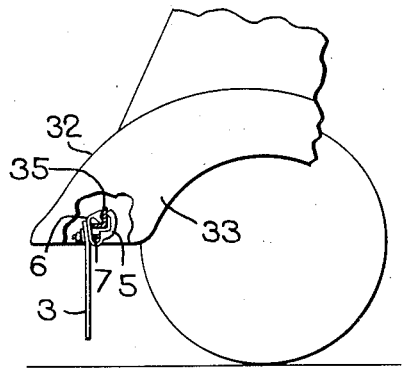
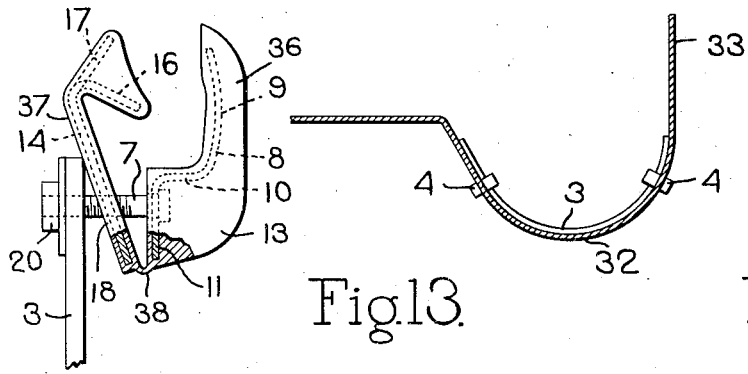
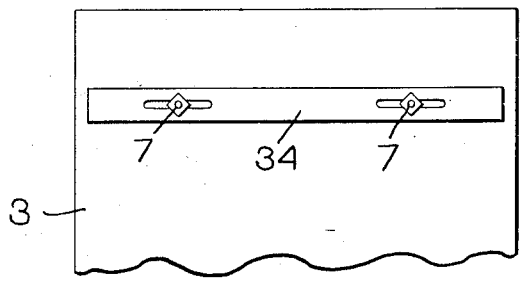
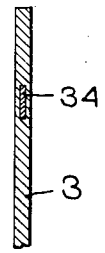

Patented Apr. 20, 1937

2,077,818

UNITED STATES PATENT OFFICE 2,077,818

SPLASH FLAP FOR AUTOMOBILES

Louis Zaiger, Lynn, Mass.

Application October 23, 1935, Serial No. 46,317

5 Claims. (Cl. 280—152)

This invention relates to splash flaps for automobiles and particularly to the clamping means employed for clamping the flap to the automobile fender.

The fenders of different makes of automobiles differ considerably in their construction, some fenders having a closed bead at their lower edge, some fenders having an open bead or flange, some fenders having a relatively small bead, some fenders having a larger bead, some fenders being relatively straight in transverse section and other fenders having more of a U shape.

One of the objects of the present invention is to provide an improved clamping means for splash flaps which is adapted for use with any of the various types of fenders used on automobiles, and which is equally well adapted for clamping the apron to the brace or partition which is used underneath some types of fenders in case it is desired to attach the splash guard to said brace rather than to the fender itself.

My improved clamping means is of that known type which includes two clamping jaws between which the edge of the fender or other support is clamped and a screw for clamping the jaws to the fender or support and also connecting the jaws to the apron.

One feature of my present invention relates to a clamping device of this type in which the jaws are permanently connected together in such a way as to permit the jaws to be separated sufficiently to embrace a relatively wide bead or flange of a fender or other support or to be closed together sufficiently to be clamped to a fender or other support having a relatively small bead.

Another feature of the invention relates to an improved construction of the inner jaw which engages the inside of the fender or other support and which prevents the jaws from being twisted off from the support after they have been clamped thereto.

Other features of the invention relate to various improvements in clamping devices for splash guards which will be more fully hereinafter set forth and then pointed out in the claims.

In the drawings:

Fig. 1 is a fragmentary view showing a splash guard embodying my invention attached to the fender.

Fig. 2 is a perspective view of the metal core member which may be used in one form of my improved clamp.

Fig. 3 is a side view of the clamp after the core has been covered with rubber but before the clamp is bent into the shape to be applied to the fender.

Fig. 4 shows the clamp bent into its U shape.

Fig. 5 is a sectional view showing the clamp applied to a fender having a relatively small bead.

Fig. 6 is a view showing the clamp applied to a fender having an open bead.

Fig. 7 is a view illustrating a different embodiment of the invention.

Figs. 8 and 9 show fragmentary details of the device illustrated in Fig. 7.

Fig. 10 is a view showing my improved splash guard as applied to a fender having a U shape in cross-section.

Fig. 11 is a view illustrating the splash flap as applied to the guard or brace beneath the U shape of the fender.

Fig. 12 is a section on the line 12—12 Fig. 10.

Fig. 13 is a fragmentary view of a splash flap having a metal strip associated therewith by which the splash flap may be given a shape to conform to the shape of the fender.

Fig. 14 is a sectional view showing an embodiment of the invention in which the metal strip is embedded in the apron.

Fig. 15 shows a clamp embodying my invention in which the jaws are permanently connected by a hinge portion formed of rubber.

In the drawings I indicates the fender of an automobile or other support to which the splash guard is secured and 2 indicates generally the splash guard. This splash guard comprises the usual apron 3 which may be of rubber, leather or any suitable material, and clamping devices 4 by which the apron is clamped to the fender I.

Each clamping device comprises an outside jaw adapted to engage the outside of the fender, an inside jaw to engage the inside of the fender and a clamping screw which clamps the jaws to the fender and also secures the clamping device to the apron 3.

The outside jaw is made with a core or body portion of metal which is covered or encased in rubber so that said jaw has a cushion surface to engage the fender or other support and thus prevent the jaw from marring the finish. In the construction shown in Figs. 5 and 6 the outside jaw is indicated at 5 and the inside jaw is indicated at 6. The outside jaw 5 comprises in its construction the body or core 8 of metal having the curved portion 9, the inwardly-directed portion 10 and the screw-receiving portion 11 which is provided with a non-circular opening 12 through which the clamping screw 7 extends. The rubber covering for said jaw is indicated at 13.

The inside jaw 6 includes in its construction a core or body member 14 provided with an opening 15 to receive the clamping screw 7 and said body member is formed at its end with the return bend 16 and also with a bracing finger 17 adapted to engage the inside of the fender and assist in preventing the clamp from being twisted off from the fender as will be presently described. This inside jaw 6 may also be encased in rubber, if desired, as shown at 18. The core or body portions 8 or 14 are permanently connected and in one embodiment of my invention the permanent connection results from the cores 8 and 14 being integrally connected by means of a narrow neck portion 19, as shown in Figs. 2 to 6, and in another embodiment of my invention the two cores 8 and 14 are permanently connected by means of a hinged connection, one form of which is shown in Figs. 7 and 8 and another form of which is shown in Fig. 15.

The core portions 8 and 14 of the jaws are relatively rigid and non-resilient, and in the construction shown in Figs. 2 and 6 the neck portion 19 by which the jaws are permanently connected can be readily bent to provide for moving the jaws toward and from each other as required to apply the clamp to the fender or other support or remove it therefrom. The body portions of the two jaws of any pair are spaced from each other throughout their entire length, that is, they are spaced from each other from the neck 19 clear to the outer end of the fender-engaging face.

In making the clamp illustrated in Figs. 2 to 6 I first provide an integral metal member as shown in Fig. 2 which comprises the two core portions 8 and 14 of the outside and inside jaws and the connecting neck 19, and this metal member is preferably initially formed with the screw-receiving portion 11 of the core 8, the neck 19 and the body of the core 14 all occupying the same plane. The rubber covering or facing is then applied to the metal core members in any suitable way. One way of applying the rubber facing would be to place the core members in a suitable mold and then fill the latter with rubber and vulcanize the rubber to the metal. Another way would be to dip the metal core members in a suitable rubber compound. Where the rubber is applied by the molding process the mold may be so shaped that different portions of the cores will have a rubber covering of different thicknesses, as shown in Fig. 3, while if the dipping process is employed the rubber covering on the core will be substantially the same thickness throughout as shown in Fig. 7.

In making the clamp shown in Figs. 3 and 6 the metal core member is provided with its coating of rubber, as shown in Fig. 3, and then the article is bent at the neck portion 19 to partially close the jaws as shown in Fig. 4 and the clamping device, when in this condition, is ready for attachment to the apron, this being done by inserting the clamping screw 7 through the openings 12 and 15 and through the space between the jaws and through the apron 3. The clamping screw 7 has a clamping nut 20 screw-threaded thereto, and said screw is secured to the screw-receiving portion 11 in any suitable way so as to prevent it from turning when the nut 20 is tightened. In the construction shown in the drawings the screw is provided with a non-circular portion 21 adapted to fit the non-circular opening 12.

If the splash guard is to be applied to a fender having a small, closed bead 22 as shown in Fig. 5 then the fender will be inserted between the jaws and the nut 20 will be tightened to clamp the jaws onto the fender with the end of the return bend 16 resting against a bead 22 and with the rubber-faced outer jaw engaging the outer face of the fender. The finger 17 engages the inside of the fender at a distance spaced from the bead so that the inner jaw has contact with the inside of the fender at two spaced points. The easily bendable qualities of the neck 19 permit the two jaws to be thus forced together and clamped to the fender. In bending the clamp from the shape shown in Fig. 3 to that shown in Fig. 5 the neck 19 is given a U shape and when the clamp is in operative clamping position the body portion of the inside jaw will be spaced from the screw-receiving portion 11 of the outside jaw and the entire clamping pressure of the screw 7 is thus applied to the portions of the jaws which engage the fender. This makes an exceedingly secure grip.

If the splash guard is to be applied to a fender having an open bead or flange 23, as shown in Fig. 6, then the nut 20 is backed off until the jaws 5 and 6 can be separated sufficiently to permit them to be placed over the wider open bead of the fender and the clamp will be placed on the fender with the outer jaw 5 engaging the outside of the fender and with the return bend portion 16 of the inner jaw hooked into the open bead 23. When thus applied and the clamping screw is tightened the lip 24 of the open bead is interlocked with the return bend 16 and the fender is clamped between the upper ends of the two jaws 5 and 6.

Some fenders may be so constructed that the lip 24 of the open bead will rest against the body portion of the inner jaw 6, but in any event the tightening of the clamping nut 20 will securely clamp the jaws to the fender.

Where the jaws are integrally connected as shown in Figs. 2 to 6 they will be held at all times in proper register with each other.

In Fig. 7 I have illustrated a different embodiment of the invention wherein the permanent connection between the jaws is in the nature of a hinged connection. In this embodiment of the invention the core or body portion 14 of the inner jaw is provided with a slot 25 and the core 8 of the outer jaw has a neck portion 26 which is bent laterally slightly and the end 27 of which is passed through the slot 25 and bent over to form a hinged connection. In this embodiment of the invention the core 8 of the outer jaw is covered with rubber, as shown at 28, and the core 14 of the inner jaw may also be covered with rubber, as shown at 29, if desired, although the rubber covering for the inner jaw is not so important.

In the construction shown in Figs. 7 and 8 the rubber covering or coating is of substantially uniform thickness throughout instead of being thicker in some portions than others as in the construction shown in Figs. 3 to 6. This hinged connection shown in Figs. 7 and 8 permits the jaws to be readily opened a sufficient distance so that they can be placed over the open bead of a fender and clamped to the latter. The hinged connection also maintains the two jaws in proper register with each other and prevents either jaw from turning about the screw 7 relative to the other jaw. In Fig. 15 I have shown still another embodiment of the invention wherein the hinged connection between the jaws is provided by a portion of the rubber in which the metal cores are encased, thereby making a rubber hinge. In this construction the outer jaw is indicated at 36 and the inner jaw at 37, these jaws having substantially the same shape and structure as the jaws 5 and 6 in Fig. 4, that is, the outer jaw 36 has the metal core 8 and the inner jaw 37 has the metal core 14. The metal cores, however, are not integrally connected but are separate pieces and the rubber 13 covering the metal core 8 and the rubber 18 covering the metal core 14 are integrally connected by a connecting portion of rubber 38 which forms the hinged connection between the jaws.

The finger 17 is an important feature of the invention as it prevents the clamp from being twisted off from the fender by application of a turning force applied clockwise in Fig. 5. If the finger 17 were not present and a sufficient force was applied to the clamp tending to turn the clamp in a clockwise direction, said clamp would fulcrum on the end of the return bend 16 and the outer jaw might be swung off from the edge of the fender.

The finger 17, however, prevents any such turning movement of the clamp because if any force was applied to the clamp tending to turn it in a clockwise direction, Fig. 5, the bracing finger 17 will, by its engagement with the fender, prevent any such turning movement and thus the clamp will be securely retained on the fender. The bracing finger 17 may be provided for in any approved way and while it is herein shown as integral with the core member 14, yet it might be made as a separate piece without departing from my invention and might also be made of other material than metal.

The construction shown wherein the inner jaw has the three gripping portions comprising the two portions 16 of the return bend and the finger 17, provides a construction which can be firmly gripped to a supporting member which is not provided with a bead, such, for instance, as the partition which is used in some fenders of the type shown in Fig. 10 for bracing the skirt portion 33.

In the construction shown in Fig. 7 the rubber covering 28 extends over the head of the clamping screw 7 and thus serves to hold the screw in place.

In Fig. 11 I have shown the splash flap as secured to the brace with which some fenders of the type shown in Figs. 10 and 11 are equipped. The brace shown has an angle-iron shape and the jaws 5 and 6 of the clamp are clamped to the brace, thereby securing the splash flap in place.

In Figs. 5 and 6 the apron 3 is shown as having an extension 31 at its upper edge which is of sufficient extent to rest against the under face of the fender 1, the purpose of this extension being to close the gap between the apron and the fender which is produced by the presence of the clamping devices. This extension may be separate from the body of the apron and secured thereto by the clamping screws 7 or may be made integral with the apron as shown in the drawings.

In Figs. 1 to 7 the splash flap is shown as applied to the type of automobile fender which is substantially straight in transverse section. In Figs. 10 and 12 I have illustrated my improved splash flap as applied to a fender which is more or less U-shaped in cross-section. In Fig. 12 the fender is indicated at 32, this fender being of that known type which is formed with a side apron 33 and which has a general U shape in cross-section as shown in Fig. 12. In using a splash flap on a fender of this type it is desirable that the flap should conform to the cross-sectional curvature of the fender and to provide for this I propose to make the flap with a metal strip member 34 which extends from one side edge to the other thereof at the point where the clamps are fastened thereto. This metal strip 34 may be applied to the exterior of the apron 3 and held in position by the clamping screws 3, as shown in Fig. 13, or the metal strip 34 may be embedded in the body of the apron 3 as shown in Fig. 14. This metal strip 34 can be readily bent to conform to the cross-sectional shape of the fender and in the case of a fender having the shape shown in Fig. 12 the clamps 4 will be secured to the two sides of the U-shaped portion of the fender as seen in Fig. 12 and the metal strip 34 will be bent to conform to the curved shape of the fender so that when the splash guard is secured to the fender it will have a curved shape from side to side which conforms to that of the fender. Since the splash flap does thus conform to the shape of the fender no opening will exist between the apron and the fender so that it will not be necessary to make the apron with the extension 31 as shown in Figs. 4 and 5.

I claim:—

1. A splash guard for automobiles comprising an apron, two rigid jaws adapted to engage opposite sides of a fender, the jaw engaging the inside of the fender having integral therewith at its end both a return bend and a bracing finger extending in the opposite direction from but at an angle to the return bend and a screw for clamping said jaws to the fender and securing them to the apron.

2. A splash guard for automobiles comprising an apron, two rigid jaws adapted to engage opposite sides of a fender, the jaw engaging the inner face of the fender having integral therewith at its end both a return bend and a bracing finger extending in the opposite direction from but at an angle to the return bend, hinge means permanently connecting said jaws and a screw for clamping said jaws to the fender and securing them to the apron.

3. A splash guard for automobiles comprising an apron, two rigid jaws integrally connected by an easily bendable neck, one of said jaws constituting an outside jaw to engage the outside of the fender and the other jaw constituting an inside jaw to engage the inside of the fender, a screw for clamping said jaws to the fender and securing them to the apron, the inside jaw having integral therewith both a return bend to hook into an open bead of the fender and a finger extending at an angle to the return bend and adapted to engage the inside of the fender above the bead.

4. A splash guard for automobiles comprising an apron, an outside jaw and an inside jaw integrally connected by an easily bendable neck and adapted to engage the outside and inside of the fender respectively, the outside jaw presenting a rigid metal core having a curved fender-engaging portion, an inwardly-directed portion and a screw-receiving portion depending from the inwardly-directed portion, a screw extending through the inside jaw and the screw-receiving portion of the outside jaw and by which the jaws are clamped to the fender.

5. A splash guard for automobiles comprising an apron, two pairs of rigid jaws, each jaw having an elongated body portion formed at its outer end with a fender-engaging face, the jaw engaging the inside of the fender having integral therewith at its end both a return bend and a bracing finger extending in the opposite direction from but at an angle to the return bend, the body portions of the two jaws of each pair being connected at the other end by an easily bendable neck which permits the jaws to swing toward and from each other through a wide angle, the body portions of the jaws being spaced from each other throughout their entire length from the neck to the outer end of the fender-engaging faces, a clamping screw anchored in the body portion of one jaw of each pair and extending through the space between the jaws and through the body portion of the other jaw and through the apron, and a clamping nut screw-threaded to each clamping screw, said screws and nuts operating to clamp the jaws to the fender and to secure them to the apron.

LOUIS ZAIGER.